3,743,629
Patented July 3, 1973

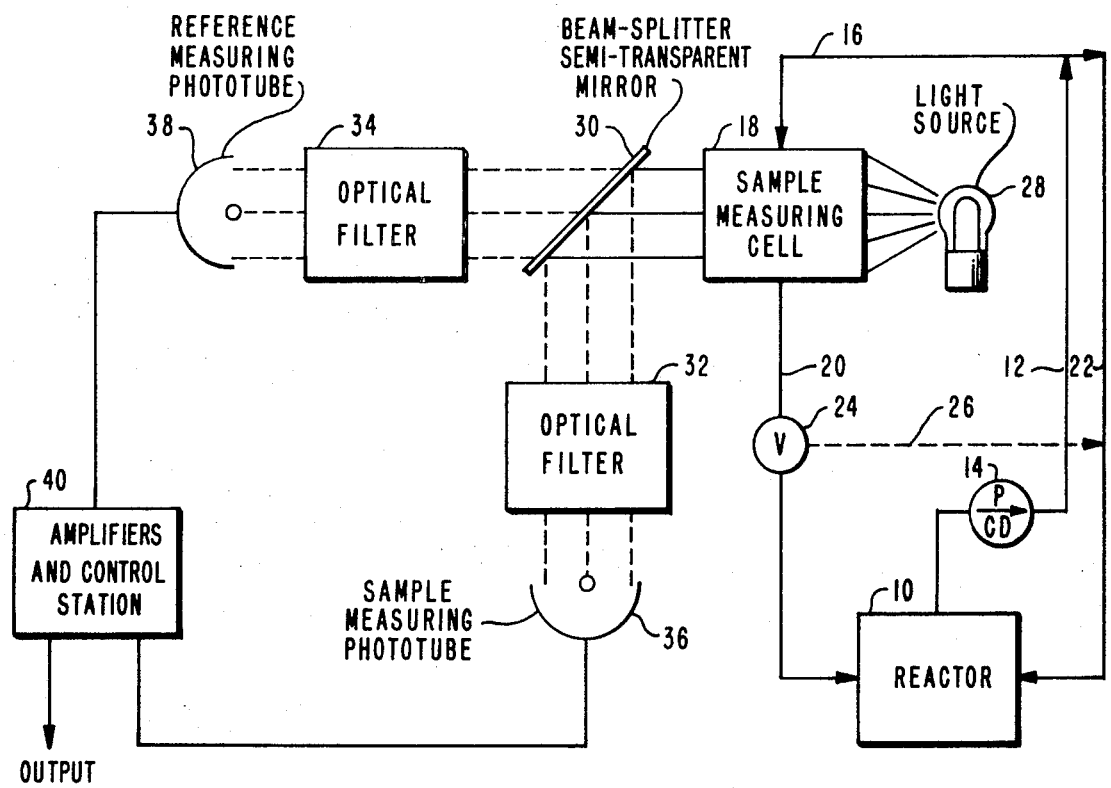

3,743,629
POLYMERIZATION MONITORING PROCESS
Donald W. Fraga, 402 Ave. E.,
Redondo Beach, Calif. 90277
Continuation-in-part of application Ser. No. 738,244,
June 19, 1968. This application July 12, 1971, Ser.
No. 161,848
Int. Cl. C08f 7/04
U.S. Cl. 260—93.5 S    7 Claims

ABSTRACT OF THE DISCLOSURE

A continuous indication of the active chain concentration in a homogeneous solution polymerization reaction admixture comprising lithium initiated polymers of vinyl arenes is obtained by comparing the absorbance of different narrow band width wavelengths of transmitted ultraviolet, visible or infrared, radiation by an active portion of the reaction admixture.

---

This application is a continuation-in-part of U.S. application Ser. No. 738,244, filed June 19, 1968, now abandoned.

It is generally believed that in the solution polymerization of unsaturated monomers to form high molecular weight polymers, the polymer chains grow during the polymerization reaction by the addition of monomer units onto the reactive end of the chain. These growing chains are variously identified as living chains or active chains and possess an active measurable chromophore. The active polymerizing admixture may, for purposes of brevity, be referred to as "active cement." After the polymerization reaction has been killed the resultant admixture may, for purposes of brevity, be referred to as "terminated cement."

The concentration of living chains in a homogeneous solution polymerization reaction mixture during polymerization strongly influences the characteristics of the final product. The average molecular weight and the molecular weight distribution of the product are influenced by the concentration of living chains during the polymerization reaction. Present procedures for rapidly determining the concentration of living chains in the reaction admixture are generally indirect and give only approximate results.

Impurities in the reactants which are fed to the reaction zone often react with the catalyst, thus reducing the amount of catalyst available for carrying out the polymerization. In general, present procedures for determining the amount of catalyst which has reacted with impurities are indirect and give only approximate results.

It is often desired to terminate a polymerization reaction at some particular point. In general, this is accomplished by adding some reagent to the polymerization reaction which will react with the catalyst or the living chain end, thus halting the growth of the polymer chains. The amount of reagent required to completely terminate a reaction, without adding large excesses of the reagent, is dependent upon the concentration of active chains in the polymerization admixture. Previously, it was generally impossible to accurately follow the course of a reaction terminating operation while such operation was being carried out.

This invention provides a rapid, continuous, and direct indication of the active chain concentration during the homogenous solution polymerization of unsaturated monomers. This procedure is applicable to both continuous and batch operations involving homo-, co-, and multi-polymerizing reaction admixtures.

In order to be useful as an accurate quantitative monitoring method, the present invention relies on polymer species having clearly ascertainable chromophores, namely, those comprising living polymers of lithium ions directly associated with at least one vinyl arene unit and preferably with a vinyl arene polymer or polymer block. These produce strongly colored chromophores, usually in shades of orange-red, which are readily and accurately determined quantitatively. Weaker chromophores wherein a diene living polymer is directly associated with a lithium polymer, are not subject to accurate quantitative monitoring by the present method. They may have some utility, however, as qualitative indicators of such polymerizations if a measuring wavelength in the ultraviolet were used.

Moreover, unless the present process is employed, involving quantitative measurements of transmitted radiation at two wave length, quantitative accuracy cannot be achieved.

For example, three U.S. patents (U.S. 2,897,247; U.S. 3,290,116; and U.S. 3,468,972) all describe what amount to colorimetric methods for monitoring certain aspects of polymerization reactions: U.S. 2,897,247 describes a light scattering method involving no living polymers and no system which involves brightly colored chromophores and which is strongly dependent on such conditions as temperature and pressure. Further, the light scattering method could not control our process by measuring both scattered radiation and a single transmitted radiation since no provision is made to provide a sample of sufficient clarity for accurate light scattering measurements. It is well known that complete removal of small particles of extraneous matter from liquids for light scattering measurements and particularly from solutions of macromolecules, which are sometimes of camparable size, is a problem peculiar to the light scattering technique. Such extreme clarification is not required for the colorimetric technique of the present invention.

U.S. 3,290,116 also is only a qualitative guide for titration of impurities. Apparently, the method involves only a determination at a single wave length of the weak yellow chromophore associated with polybutadiene-lithium polymer. The method does not and cannot involve the dual quantitative determination of strong chromophore radiation at two wave lengths. U.S. 3,468,972 likewise relies on the weak polydiene-lithium. Even with an added agent, the chromophore develops only a weak yellow. The method might be somewhat useful for coupling control, but would have no utility as a quantitative tool.

The present invention may be performed in the presence or absence of extraneous reagents such as ethers, thioethers or amines, but does not rely on their presence to produce a chromophore capable of being used for quantitative monitoring. Thus, the present method does not rely upon alterations such as materials added to the sample which are not already present in the main body of the active polymerization reaction mixture.

According to this invention, a rapid, continuous, and direct indication of the active chain concentration in an active cement comprising living polymers of a lithium ion directly associated with a vinyl arene polymer. This is provided by comparing the absorbance of one narrow band width wavelength of transmitted radiation by an active portion of the cement with the absorbance of a second narrow band with wavelength of transmitted radiation by the same active portion of the cement. This comparison is accomplished using two narrow band wavelengths of radiation in a single cell photometer. This procedure is applicable to reaction admixtures which, in the active state during polymerization, have quantitatively measurable absorbance characteristics (attributable to the living chain ends) for a first predetermined wavelength of radiation which are different from those of the same cement at the same stage of polymerization for a second quantitatively measurable predetermined wavelength of radiation. The procedure is particularly desirable where the background interference is small in comparison with the absorbance of the active chromophore which is associated with the living chain ends.

The indication of the active chain concentration in the polymerization zone may be recorded for visual observation, such as, for example, or a moving graph. Also, the indication of the active chain concentration may be converted into a suitable signal which is transmitted through known control devices to regulate or adjust at least one process variable in the polymerization zone in response to indicated changes in the active chain concentration. If desired, both a visual indication, in the form of a moving graph or other means, and automatic regulation of the process variables may be provided.

A calibration curve is conveniently established by plotting the net photometer readings obtained for the differential absorbance of transmitted radiation against values obtained for the same active cements by known analytic procedures, such as for example, tritium-counting. This analytic procedure is described in the Journal of Polymer Science, part A, vol. 3, pp. 2243–2257 (1965), "Alkyl-Free Cobalt Catalyst for the Stereospecific Polymerization of Butadiene"; J. G. Balas et al. Using such a calibration curve it is possible to obtain a direct indication of the active chain concentration in an active cement.

According to this invention, a homogeneous solution polymerization reaction admixture is established in a reaction zone according to known procedures and using a lithium-based initiator for polymerization of vinyl arene-containing polymers wherein at least one vinyl arene unit is directly associated with a lithium ion to form "living polymers." A representative sample of the reaction mixture is withdrawn from the reaction zone. Preferably the sample is withdrawn continuously and at a high flow rate. At least a portion of the sample is passed through a measuring cell in a single cell photometer. A beam of transmitted radiation is passed through the sample containing measuring cell, after which it is split into two beams having different optical characteristics. The measuring wavelength is chosen from those strongly absorbed by the chromophore which is associated with the living chain ends, and the reference wavelength is chosen so that the acetive cement absorbs the radiation very weakly, or not at all. The differential absorbance of the radiation passed through the measuring cell is obtained by impinging the two beams on separate phototubes and comparing the output from the two phototubes. The output from the phototubes may be amplified and recorded or used to activate means for regulating one or more process variables in the polymerization zone.

Referring particularly to the drawing, there is illustrated a schematic drawing of one embodiment of the invention.

With particular reference to the drawing there is illustrated schematically a reactor 10. Conduit 12 is positioned so as to withdraw a representative sample of active cement from the reaction zone in reactor 10 by means of constant discharge pump 14. Sample conduit 16 carries active cement directly to sample measuring cell 18. Return conduit 20 carries cement from cell 18 back to the reaction zone in reactor 10. Active cement under pressure from conduit 12 bypasses cell 18 and is recycled to the reaction zone in reactor 10 through conduit 22.

The photometer which is used to compare the absorbance characteristics of the sample in cell 18 is indicated schematically in the drawing and includes a light source 28 which transmits a beam of radiation through sample measuring cell 18. After passing through cell 18 the transmitted beam of radiation comes into contact with semitransparent mirror 30, which divides the transmitted beam of radiation into two beams having the same characteristics. One of the beams is reflected from mirror 30 and passes through sample measuring filter 32. The other beam passes through mirror 30 to reference filter 34. Optical filter 32 removes extraneous wavelengths of radiation from the first beam. The first beam is then impinged upon sample measuring phototube 36. The second beam leaves mirror 30 and passes through optical filter 34. Optical filter 34 removes extraneous wavelengths of radiation from the second beam. From optical filter 34 the second beam is impinged upon reference measuring phototube 38. The outputs of phototubes 36 and 38, respectively, are amplified and compared in amplifier and control station 40, which in turn generates an output of predetermined desired characteristics. The nature of the amplifier and control station 40 and the output generated by these devices are well known.

The optical filters 32 and 34 are of such a nature that they will pass only a narrow band width of radiation. The characteristics of these filters are such that they will pass the precise wavelength for which they are calibrated and a band width of about 10 to 25 angstroms, and preferably of about 5 to 15 angstroms.

The wavelengths of transmitted radiation which are employed in the photometer are selected so that there will be a minimum of interference from chromophores other than that which it is desired to detect. In general the selected wavelengths for both the reference and sample measuring beams are within the ultraviolet and visible range of from about 1,800 to 7,000 angstroms. When desired, wavelengths from the infrared range of from about 7,000 to 14,000 angstroms may be used where active chromophores are present for this infrared range. Preferably the selected wavelength for both beams are as close to one another as possible and are in the visible and near visible range of from about 3,000 to 6,000 angstroms.

In the following examples and throughout this disclosure all parts and percentages are by weight unless otherwise stated.

EXAMPLE I

A polystyrene-polyisoprene-polystyrene block polymer is prepared, and the concentration of living chain ends during the polymerization of the first and second styrene blocks is monitored using a single cell photometer. The first styrene block is polymerized according to the following procedure: All of the styrene monomer required for the first block polymerization is rapidly added to purified cyclohexane solvent. The reagents and the polymerization zone are maintained under an inert nitrogen atmosphere. Butyllithium initiator is added to the charge in the reaction vessel in small increments, or less than three parts per million each; and the reactive admixture is monitored with a single cell photometer. As soon as incipient polymerization initiation is signaled by the appearance of active chromophores, as detected by the single cell photometer, the total amount of butyllithium initiator, which it has been predetermined will be required for the polymerization, is added at one time. The intensity of the active chromophore increases rapidly to a maximum value, which is reached in about 15 minutes. Throughout the scavenging of the cyclohexane solvent and the polymerization reaction, the admixture containing the active chromophore is pumped at such a high rate of flow through the measuring cell of the photometer that there is never more than 6 seconds time lag between the withdrawal of the admixture from the reaction zone and the measuring of the chromophore concentration in the measuring cell. The polymerization recipe used for the first block styrene polymerization is as follows:

| Charged material: | Parts by weight |
|---|---|
| Styrene monomer | 10 |
| Cyclohexane solvent | 90 |
| Butyllithium initiator | 0.05 |

The isoprene block is prepared by charging the active styrene reaction admixture to a reaction vessel containing one hundred parts by weight of isoprene monomer and nine hundred parts by weight of cyclohexane solvent.

After substantially all of the isoprene monomer has reacted, the quantity of styrene, 10 parts by weight, required to complete the polymerization of the second styrene block is added rapidly to the reactive admixture; and the concentration of the active chromophore is monitored by the use of a single cell photometer. The polymerization of the second styrene block proceeds at about the same rate as that of the first styrene block. There is substantially no interference from the isoprene block to the monitoring of the active chromophore concentration during the polymerization of the second styrene block. The second styrene block reaches a maximum concentration of acetive chromophore after a period of about 15 minutes. After a period of about 3 hours, the reaction is terminated by the addition of methanol.

During the period of polymerization of the first styrene block, a stream of the reactive admixture is continuously and rapidly withdrawn from and recycled to the reaction vessel. A portion of this recycling stream is passed through the measuring cell of the single cell photometer. The bulk of the stream bypasses the cell and is returned directly to the reaction vessel. This high rate of recycle insures that a representative sample of the admixture in the reaction zone will be passed through the measuring cell almost instantaneously. The concentration of active chromophores changes rapidly during the first few minutes of the styrene polymerization reaction so that current information about active chromophore concentration requires an almost instantaneous measurement. The path length of the measuring cell is three millimeters. A beam of transmitted radiation consisting of a broad band of ultraviolet and visible wavelengths is passed from a source through the measuring cell to a beam splitter semi-transparent mirror. The transmitted beam of ultraviolet and visible radiation is split into two beams. One of the split beams is passed through a sample measuring optical filter which permits only a narrow band width of near visible ultraviolet radiation centered at 4,360 angstroms units to pass through the filter. This wavelength is strongly absorbed by the active chromophore which is associated with the living styrene chain ends in the active cement. The second split beam of transmitted radiation is passed through a reference measuring optical filter which permits only visible radiation at a narrow band width wavelength centered at 5,460 angstrom units to pass. This reference wavelength is absorbed only very weakly by the active chromophore which is associated with the living chain ends in the active cement. The beam which is passed through the sample measuring optical filter is impinged on a sample measuring phototube, and the beam which is passed through the reference measuring optical filter is impinged on a reference measuring phototube. The output from the respective phototubes is a current which is directly proportional to the light intensity striking the respective photocubes. The output from the respective phototubes is amplified and fed into a control station, where the difference between the amplified output voltage of the sample phototube and the amplified output voltage of the reference phototube is obtained. This difference is due to the concentration of the active polymer in the measuring cell, since the background absorption is substantially the same at each of the wavelengths employed. The difference varies in response to changes in the concentration of the living chain ends in the active cement. This difference is recorded for visual reference on a moving graph. The difference recorded on the graph is the net photometer reading. The photometer employed in monitoring the active chain concentration is commercially available and is identified as the "Du Pont 400 Photometric Analyzer."

During the course of the polymerization reaction at several different net photometer readings, samples of the active cement are withdrawn from the reactor. These withdrawn samples are killed with tritiated methyl alcohol which adds a tritium (radioactive hydrogen) to each polymer chain that contains active lithium in the same proportion that tritium is present among the active hydrogens of the tritiated methanol. Analysis of these killed withdrawn samples for tritium gives the concentration of active lithium (measured as butyllithium) in the active cement. The values obtained analytically by tritium counting are correlated with the net photometer readings, and a calibration curve is prepared. The curve indicates active polystyrene concentration expressed as parts per million (ppm) butyl lithium directly from net photometer readings. The molecular weight of the polystyrene is calculated from the solids content and the active polystyrene concentration in the active cement.

EXAMPLE II

Calibration curves may be obtained and the course of the reactions may be followed with accurate reproducible results using the procedures described in the foregoing example, substituting vinyl toluene, alpha methyl styrene, divinyl benzene, vinyl naphthalene, 1-4 diphenyl butadiene, or vinyl pyridine for the reactive monomer, and benzene, tetrahydrofuran, or diphenyl ether for the solvent. For tetrahydrofuran solvent the active chromophores absorb more transmitted radiation than is absorbed when cyclohexane is used as the solvent. Calibration curves may be established according to the procedures described in the above examples using butylsodium, butylcesium, butylrubidium, or butylpotassium in the place of the butyllithium according to known polymerization recipes.

The solution polymerization of styrene in a hydrocarbon solvent is monitored employing a sample measuring narrow band width wavelength focused at about 4,360 angstrom units. The peak absorption of the polystyryllithium carbanion occurs at about 3,200 angstrom units; however, the absorption at this peak is so strong that substantially all of the radiation at this wavelength is blocked out even in a sample cell having a path length of less than 0.1 millimeter. The active cement cannot be pumped at a satisfactory rate through a cell which has less than about a 0.1 millimeter path length. For this reason it is impractical to reduce the cell path length to a value at which enough radiation at the measuring wavelength is transmitted through the cell to permit accurate measurements of its intensity. At a sample measuring wavelength of 4,360 angstroms a sample cell having a path length of three millimeters will permit a sufficient amount of the radiation to pass through the cell so that accurate measurements may be obtained of the variations in the intensity of the transmitted radiation. Increasing the path length of the cell beyond about three millimeters reduces the amount of radiation which is passed through the cell to the point where changes in its intensity are not detectable even at a measuring wavelength of 4,360 angstroms. Reducing the cell path length below about 0.1 millimeter restricts the flow of active cement through the cell to such an extent that the readings are not representative of the current conditions in the reaction zone. When the concentration of the living chain ends is changing rapidly, such as during the initial stages of the reaction or when the reaction is being terminated by some reagent such as methanol, it is necessary for the operator to be informed of the current conditions in the reaction zone so that he can immediately take remedial action if the reaction does not proceed as planned. In general the period of time between withdrawal of the sample from the reaction zone and measuring of the sample in the cell is from about 1 to 20 seconds and preferably from about 1 to 10 seconds or less.

The reference measuring beam is focused at a wavelength of 5,460 angstroms because this is a convenient wavelength close to the sample measuring wavelength at which the absorbance due to polystyryllithium carbanion has essentially disappeared in comparison with the background interference.

The process of this invention is adapted to constantly and accurately monitor the active concentration of an active cement at living chain concentrations, expressed as parts per million of butyllithium, ranging from as low as about 1 part per million up to about 600 parts per million and above. In general most polymerization reactions are conducted in such a manner that the active chain concentration is below about 400 parts per million.

The procedure of this invention is particularly applicable to those polymerization reactions in which there is little or no background interference at the reference and sample measuring wavelengths and the desired chromophore absorbs strongly at the sample measuring wavelength. In general the wavelengths of the measuring radiation should be selected so that their frequencies are as close together as possible and there is a minimum of background interference from chromophores other than the desired chromophore. This procedure is particularly useful in monitoring the polymerizations wherein a polystyrene block is directly associated with a lithium ion, because the polystyrllithium carbanion exhibits strong absorbance and the background interference is small.

The molecular weight of the final polymerized product is very sensitive to the amount of lithium-based initiator utilized in the polymerization reaction. The presence of impurities in the reaction admixture in the reaction zone makes it impossible to accurately predict the amount of catalyst which will be available for the polymerization reaction. The use of the present invention permits almost instantaneous detection of the formation of living polymer chains. When small amounts of catalyst are admixed incrementally to the reaction admixture, the appearance of living chains indicates that all of the impurities have been titrated with catalyst, and any additional amounts of catalyst which may be added will all be available for the polymerization reaction. In this manner the amount of catalyst which is calculated to give the desired molecular weight may be added as soon as the net photometer readings indicate that all of the impurities have been titrated by previous additions of catalyst. This very accurate control of catalyst concentration in the reaction zone permits the achievement of a predetermined molecular weight. Catalyst and monomer concentration may be adjusted during the reaction in response to photometer readings.

The deactivating agent which is used to terminate the living polymer chains after the reaction is complete is selected so that it has no absorbance characteristics which interfere with the absorbance characteristics of the active cement at the wavelengths being used. In general, suitable deactivating agents are liquids which may be injected into and admixed with the reaction admixture. Suitable deactivating agents include; for example, isopropyl alcohol, s-butyl alcohol, methanol, and the like.

The closed loop fluid handling system which withdraws a sample of the reaction admixture from the reaction zone and pumps is through the cell of the photometer and returns it to the reaction zone is preferably so designed that a minimum time lapse occurs between the withdrawal of the sample from the reaction zone and the subjection of that sample to a beam of transmitted radiation. The withdrawn samples are preferably maintained under pressure so as to prevent the formation of bubbles which would interfere with the measurement of the fluid's absorption characteristics. The fluid handling system is so designed that the temperature of the sample does not fluctuate greatly between the time it is withdrawn from the reaction zone and the time it is subjected to transmitted radiation in the cell of the photometer.

The photometer is designed so that the only variable in the optical system between the light source and the phototubes is attributable to the absorption characteristics of the sample within the cell. During operation the radiation from the sample measuring and reference beams strikes the respective phototubes, and a current output is developed by each phototube which is directly proportional to the light intensity striking that phototube. Amplifiers are provided for each phototube. The logarithmic characteristic of the measuring and reference amplifiers causes each to produce a direct current voltage output which is directly proportional to the logarithm of the phototube currents. The currents are subtracted in a control box to produce a final output which is proportional to the difference between the logarithms of the phototube currents. This final output voltage is also proportional to the difference between logarithms of the intensities of the reference and measuring beams. According to Beer's Law of Optics this difference in logarithms is directly proportional to the sample concentration and thickness. The final output voltage varies linearly with sample concentration and thickness. The sample thickness, or cell path length, is maintained constant. As the concentration of the active chains vary in the sample cell, the light arriving at the sample measuring phototube also varies and so does the measuring phototube current. The reference circuit, however, is not affected at all since the change in the concentration of the active chains in the reference cell does not change the amount of light arriving at the reference measuring phototube. The sample thickness remains constant so the final output voltage varies in response to changes in the active chain concentration in the sample. Instruments of this type are available commercially, one of which is identified as the "Du Pont Model 400 Photometric Analyzer."

In general, this invention is particularly useful when employed to monitor those homogeneous solution polymerization reactions wherein the reactive monomers exhibit strong absorbance for at least one narrow band width wavelength of radiation in the ultraviolet or visible region. Suitable monomers for use in such a process include vinyl aromatic monomers, for example, mono-, di- and trivinyl aromatic monomers and alkyl substituted mono-, di- and trivinyl aromatic monomers such as styrene, alpha methyl styrene, vinyl toluene, divinyl benzene, vinyl naphthalene, trivinyl benzene, divinyl xylene, divinyl methyldiphenyl, divinyl naphthalene, trivinyl toluene, and the like. This list will suggest to those skilled in the art many other known monomers which may be polymerized by a homogenous solution polymerization process.

It will be understood that these can be copolymerized with other monomers, such as conjugated dienes, as long as the lithium ion associated with each chain is directly associated with at least one vinyl arene unit, and preferably with a polymer block of at least one vinyl arene. Suitable copolymerizable dienes include butadiene and isoprene. In addition to preparation of polystyrene and poly(alpha methyl styrene), the present process is especially suitable for the preparation of block copolymers having alternating blocks of conjugated dienes and vinyl arenes such as polyisoprene-polystyrene, polystyrene-polybutadiene-polystyrene and the like.

Suitable diluents or solvents, for use in solution polymerization recipes, are well known and include, for example, non-polar hydrocarbon diluents such as aliphatic, cycloaliphatic, or aromatic hydrocarbons containing four or more carbon atoms, ethers, and amines in admixture with other diluents. Specific diluents include; for example, cyclohexane, isopentane, octane, hexane, benzene, toluene, tetrahydrofuran, diphenyl ether, and the like. Any diluent may be used according to the present invention provided it does not have an absorbance characteristic which interferes with the comparison of the absorbance of the sample measuring wavelength of the transmitted radiation by the active cement.

What has been described are preferred embodiments in which changes and modifications may be made therefrom without departing from the spirit and scope of the accompanying claims.

I claim as my invention:

1. A process comprising:
   (a) removing a stream of an active polymerizing reaction mixture from a body of said admixture in a homogeneous solution polymerization zone and recycling said stream to said zone wherein vinyl arenes are being polymerized with organolithium initiators, said admixture containing an active measurable chromophore comprising a lithium ion directly associated with a poly(vinyl arene) carbanion;

(b) separating without alteration at least a portion of said stream which is sufficient to provide a measuring sample that is representative of said reaction mixture in said zone; and (c) comparing absorbance characteristics of light transmitted through said sample having a path length between about 0.1 and about 3 mm. for a first narrow band wavelength of transmitted radiation to the absorbance characteristics of said sample for a second narrow band wavelength of transmitted radiation, both of said radiations being within the ultraviolet or visible range of from about 1800 to 7000 angstroms or the infrared range of from about 7000 to 14,000 angstroms, said first wavelength of radiation being strongly but measurably absorbed by said chromophore and said second wavelength of radiation being substantially unabsorbed by said chromophore.

2. A process according to claim 1 wherein the selected wavelengths for both beams are within the range from about 3,000 to 6,000 angstroms.

3. A process according to claim 1 wherein the comparison is used to obtain an indication of the active polymer chain concentration in said active cement.

4. A process according to claim 1 wherein the carbanion is a polystyryl carbanion.

5. A process according to claim 4 wherein the measurable chromophore is polystyrene-polybutadiene-polystyryl-lithium.

6. A process according to claim 4 wherein the first narrow wavelength of transmitted radiation is focused on about 4,360 angstroms and the second narrow band wave length of transmitted radiation is focussed on about 5,460 angstroms.

7. A process according to claim 1 wherein at least one reaction condition in said reaction zone is adjusted in response to the results obtained by comparing said absorbance characteristics.

References Cited

UNITED STATES PATENTS 3,553,295   1/1971   Bean et al. _____ 260—879

JOSEPH L. SCHOFER, Primary Examiner

W. F. HAMROCK, Assistant Examiner

U.S. Cl. X.R.

260—83.7, 94.2 M, 880 B